(12) United States Patent
 Osuki

(10) Patent No.: US 9,939,768 B2
(45) Date of Patent: Apr. 10, 2018

(54) PRINTING APPARATUS, METHOD FOR CONTROLLING THE SAME, AND STORAGE MEDIUM

(71) Applicant: CANON KABUSHIKI KAISHA, Tokyo (JP)

(72) Inventor: Takashi Osuki, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/017,402

(22) Filed: Feb. 5, 2016

(65) Prior Publication Data

US 2016/0231684 A1   Aug. 11, 2016

(30) Foreign Application Priority Data

Feb. 10, 2015   (JP) .................................. 2015-024503

(51) Int. Cl.
 *G03G 15/00* (2006.01)
 *G06F 3/12* (2006.01)
(52) U.S. Cl.
 CPC ......... *G03G 15/553* (2013.01); *G03G 15/502* (2013.01); *G06F 3/121* (2013.01); *G06F 3/1294* (2013.01); *G03G 2215/00729* (2013.01)

(58) Field of Classification Search
 None
 See application file for complete search history.

(56) References Cited

U.S. PATENT DOCUMENTS

| | | | |
|---|---|---|---|
| 6,275,712 B1* | 8/2001 | Gray | H04B 1/40 455/522 |
| 2005/0254831 A1* | 11/2005 | Soga | G03G 15/50 399/12 |
| 2007/0177439 A1* | 8/2007 | Saito | B41J 3/46 365/190 |
| 2009/0190937 A1* | 7/2009 | Willis | G03G 15/55 399/27 |
| 2011/0262154 A1* | 10/2011 | Ajima | G03G 15/553 399/27 |

FOREIGN PATENT DOCUMENTS

JP    2006-343621 A    12/2006

* cited by examiner

*Primary Examiner* — Thomas Giampaolo, II
(74) *Attorney, Agent, or Firm* — Canon U.S.A., Inc. IP Division

(57) ABSTRACT

A printing apparatus that sets a setting value to be used as a threshold value for notifying the user of a decreased amount of recording material, the setting value being one of a first setting indicating that a threshold value set by a user is to be used or a second setting indicating that the user-set threshold value is not to be used.

15 Claims, 9 Drawing Sheets

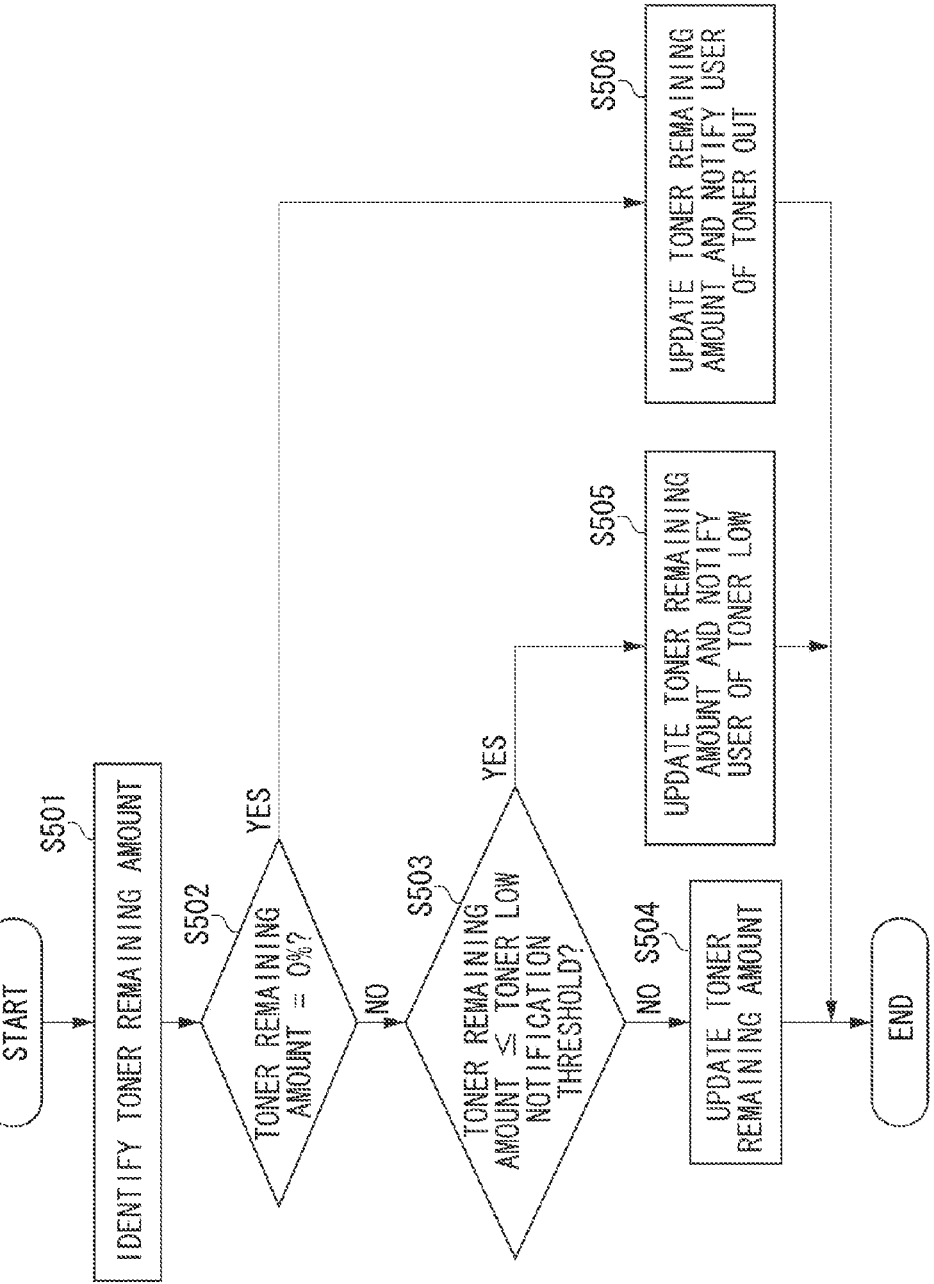

TONER OUT NOTIFICATION SCREEN 600

TONER LOW NOTIFICATION SCREEN 610

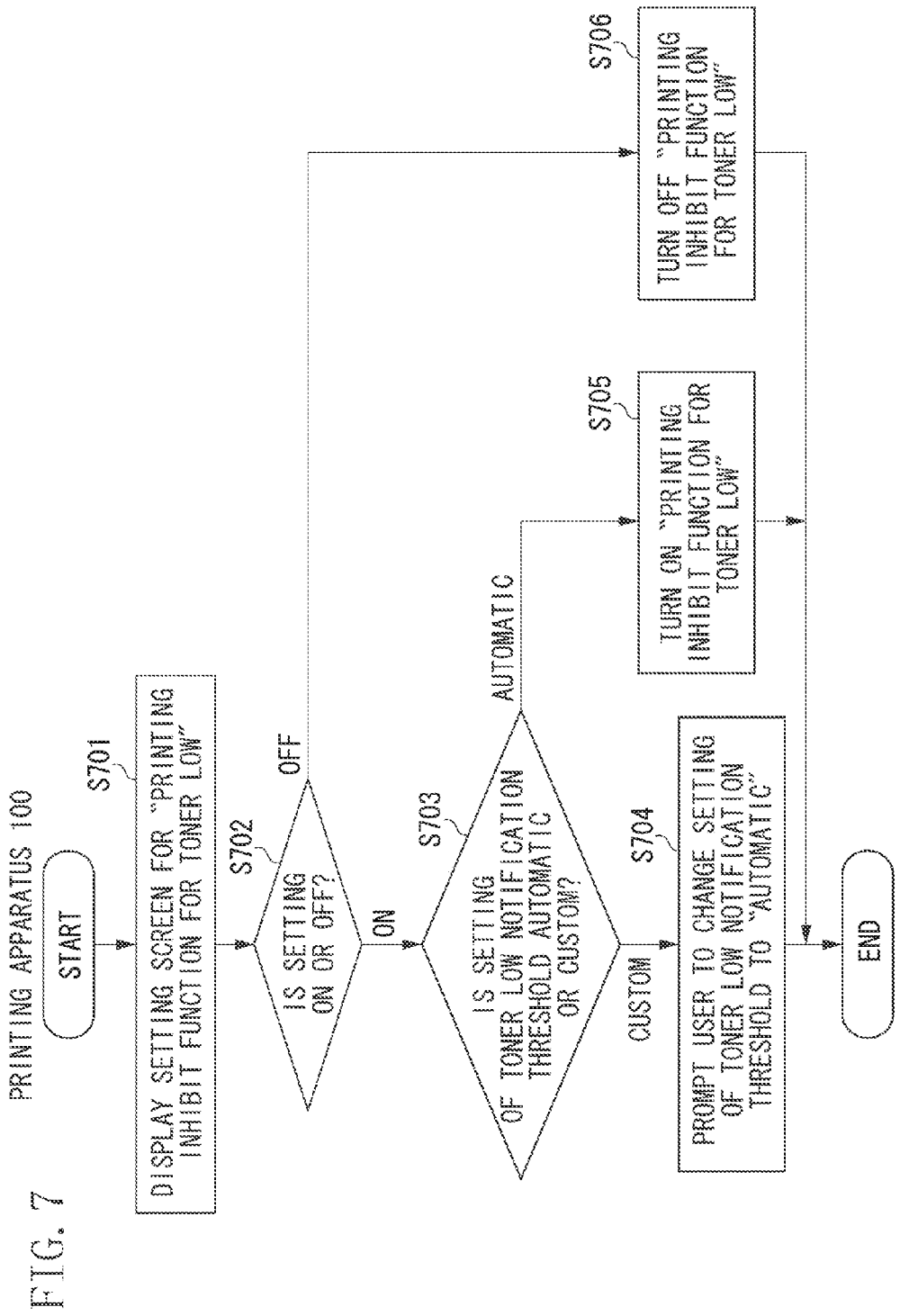

SETTING SCREEN 800

WARNING SCREEN 810

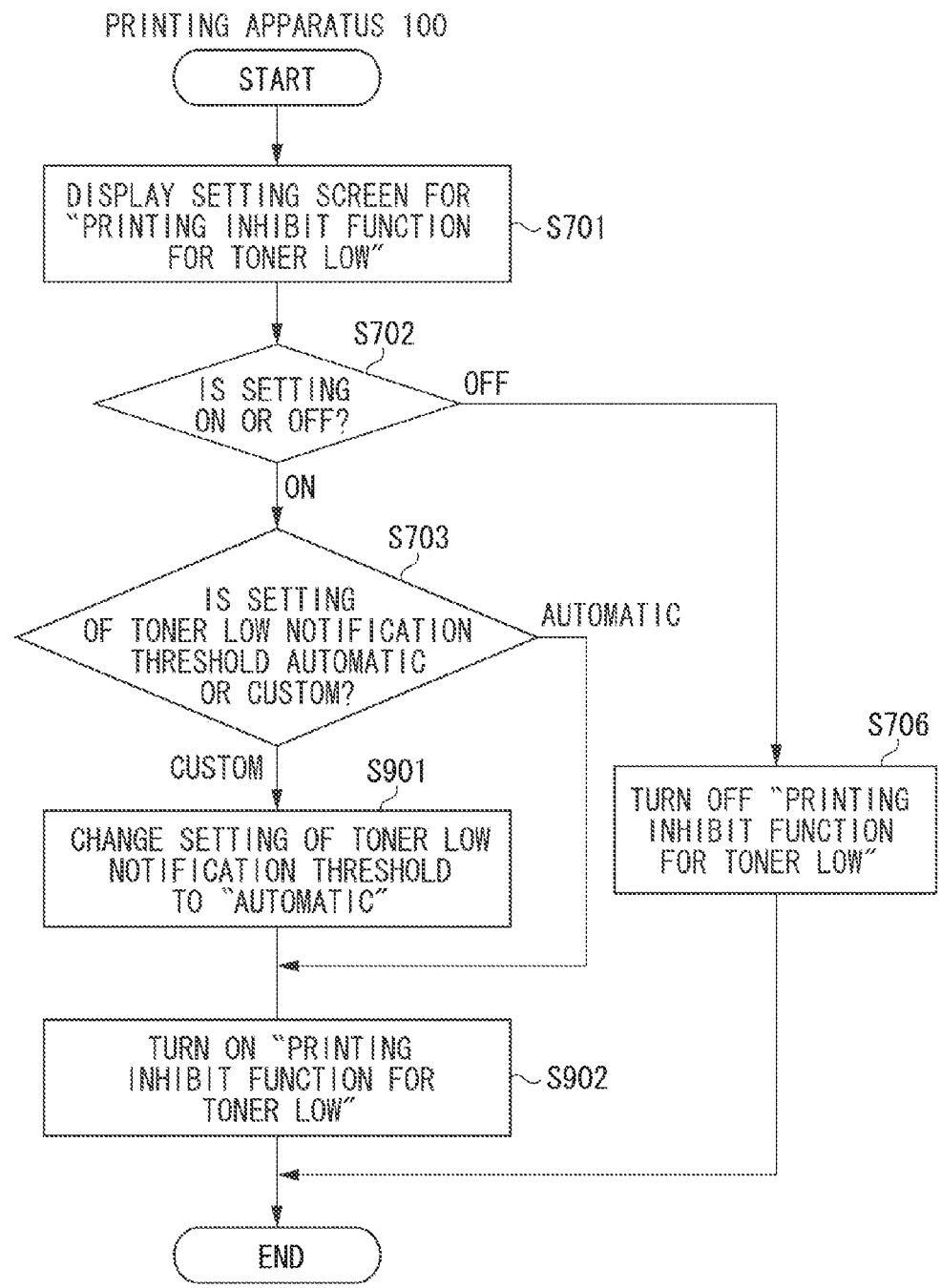

PRINTING APPARATUS, METHOD FOR CONTROLLING THE SAME, AND STORAGE MEDIUM

BACKGROUND OF THE INVENTION

Field of the Invention

The present invention relates to a printing apparatus, a method for controlling the printing apparatus, and a storage medium.

Description of the Related Art

A printing apparatus performs print processing on a sheet by using a recording material such as toner and ink. The recording material such as toner and ink is stored in a storage unit called a cartridge. The printing apparatus detects the remaining amount of the recording material stored in the storage unit, and displays the detected remaining amount on a display unit. When the remaining amount of the recording material decreases down to a predetermined threshold value or below, the printing apparatus further notifies a user of the decreased remaining amount of the recording material.

In many cases, the printing apparatus can only roughly detect the toner remaining amount. More specifically, the printing apparatus can only correctly detect limited toner remaining amounts such as 0%, 20%, and 50%. Japanese Patent Application Laid-Open No. 2006-343621 discusses a method for correcting detectable remaining amounts in such a printing apparatus. Japanese Patent Application Laid-Open No. 2006-343621 discusses a technique for predicting the toner remaining amount after completion of printing, by calculating the toner consumption amount based on the dot count value of print data and then subtracting the calculated toner consumption amount from the toner remaining amount. The use of the technique discussed in Japanese Patent Application Laid-Open No. 2006-343621 enables even a printing apparatus capable only of roughly detecting the toner remaining amount to predict the toner remaining amount and notify a user of the detailed toner remaining amount.

When the toner remaining amount has decreased down to a certain amount, the printing apparatus notifies the user of toner LOW indicating the decreased toner remaining amount. Meanwhile, there is a user demand for freely changing a threshold value as a reference value for making a toner LOW notification. For example, when the toner remaining amount is about 10%, a certain user does not replace the toner cartridge immediately after the user is notified of toner LOW. Such a user desires to change the toner LOW threshold value to a smaller value.

However, in the technique discussed in Japanese Patent Application Laid-Open No. 2006-343621, a predicted value is used to detect the toner remaining amount, hence there may be a large difference between the predicted toner remaining amount and the actual toner remaining amount. For example, there is a case where the actual toner remaining amount considerably decreases before the predicted toner remaining amount decreases down to a threshold value set by the user. In such a case, a printing failure not intended by the user occurs, for example, printed characters may become faded although the user is not notified of toner LOW.

On the other hand, if the user is not allowed to set the threshold value at all, the above-described demand is not satisfied.

SUMMARY OF THE INVENTION

The present invention is directed to providing a mechanism for selecting whether to use a threshold value set by user so that the user can be notified of a decreased remaining amount of a recording material.

According to an aspect of the present invention, a printing apparatus for performing printing on a sheet by using a recording material includes, a setting unit configured to set a setting value to be used as a threshold value for notifying the user of a decreased amount of recording material, the setting value being one of a first setting indicating that a threshold value set by a user is to be used or a second setting indicating that the user-set threshold value is not to be used, an identification unit configured to identify the remaining amount of the recording material, and a notification unit configured to notify the user of the decreased remaining amount of the recording material. In a case where the first setting is made by the setting unit, and the remaining amount of the recording material identified by the identification unit is equal to or smaller than the user-set threshold value, the notification unit notifies the user of the decreased remaining amount of the recording material.

Further features of the present invention will become apparent from the following description of exemplary embodiments with reference to the attached drawings.

BRIEF DESCRIPTION OF THE DRAWINGS

FIG. 5 is a flowchart illustrating processing for notifying a user of toner LOW and toner out.

FIG. 7 is a flowchart illustrating processing for changing the setting of the toner LOW notification threshold value.

FIG. 9 is a flowchart illustrating processing for changing the setting of the toner LOW notification threshold value.

DESCRIPTION OF THE EMBODIMENTS

Exemplary embodiments of the present invention will be described below with reference to the accompanying drawings. The following exemplary embodiments do not limit the present invention within the ambit of the appended claims. Not all of the combinations of the features described in the exemplary embodiments are indispensable to the solutions for the present invention.

Figure 1:
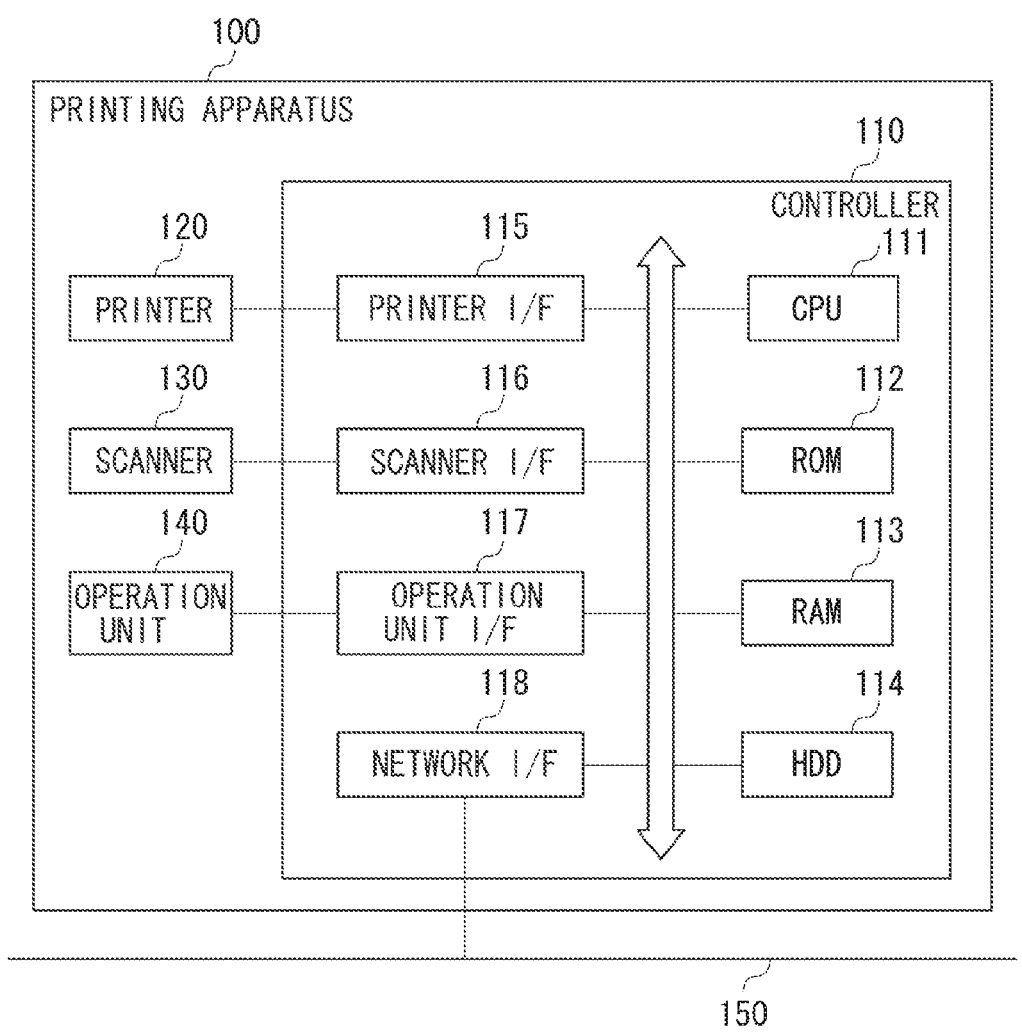
FIG. 1 illustrates a configuration of a printing apparatus.

A first exemplary embodiment will be described below. FIG. 1 illustrates a configuration of a printing apparatus 100. The printing apparatus 100 is connected to a network 150 and is capable of communicating with an external apparatus (for example, a host personal computer (PC)) on the network 150. The printing apparatus 100 includes a controller 110, a printer 120, a scanner 130, and an operation unit 140.

The controller 110 controls operations of the entire printing apparatus 100. A central processing unit (CPU) 111 reads a control program stored in a read only memory (ROM) 112 and performs various processing for controlling operations of the printing apparatus 100. The ROM 112 stores control programs. A random access memory (RAM) 113 is used as a main memory for the CPU 111 and as a temporary storage area such as a work area. A hard disk drive (HDD) 114 stores various data such as print jobs and scan images.

Although, in the case of the printing apparatus 100, one CPU 111 performs processing by executing instructions listed in the flowcharts (described below), other mode is also applicable. For example, the processing of the flowcharts (described below) may be performed by a plurality of CPUs in a collaborative way. Further, a part of processing of the flowcharts (described below) may be performed by a hardware circuit.

A printer interface (I/F) 115 connects the printer 120 and the controller 110. The CPU 111 is able to control operations of the printer 120 via the printer I/F 115. The printer 120 performs print processing on a sheet based on a print job received from an external apparatus and a scan image generated by the scanner 130. The configuration of the printer 120 will be described in detail below with reference to FIG. 2 (described below).

A scanner I/F 116 connects the scanner 130 and the controller 110. The CPU 111 is able to control operations of the scanner 130 via the scanner I/F 116. The scanner 130 reads a document and generates a scan image. The scan image generated by the scanner 130 is printed by the printer 120 or stored in the HDD 114.

An operation unit I/F 117 connects the operation unit 140 and the controller 110. The CPU 111 is able to control operations of the operation unit 140 via the operation unit I/F 117. The operation unit 140 is provided with a liquid crystal display (LCD) unit having touch-panel functions, and a keyboard, and displays various screens (described below). A user is able to input instructions and information to the printing apparatus 100 via the operation unit 140.

Figure 2:
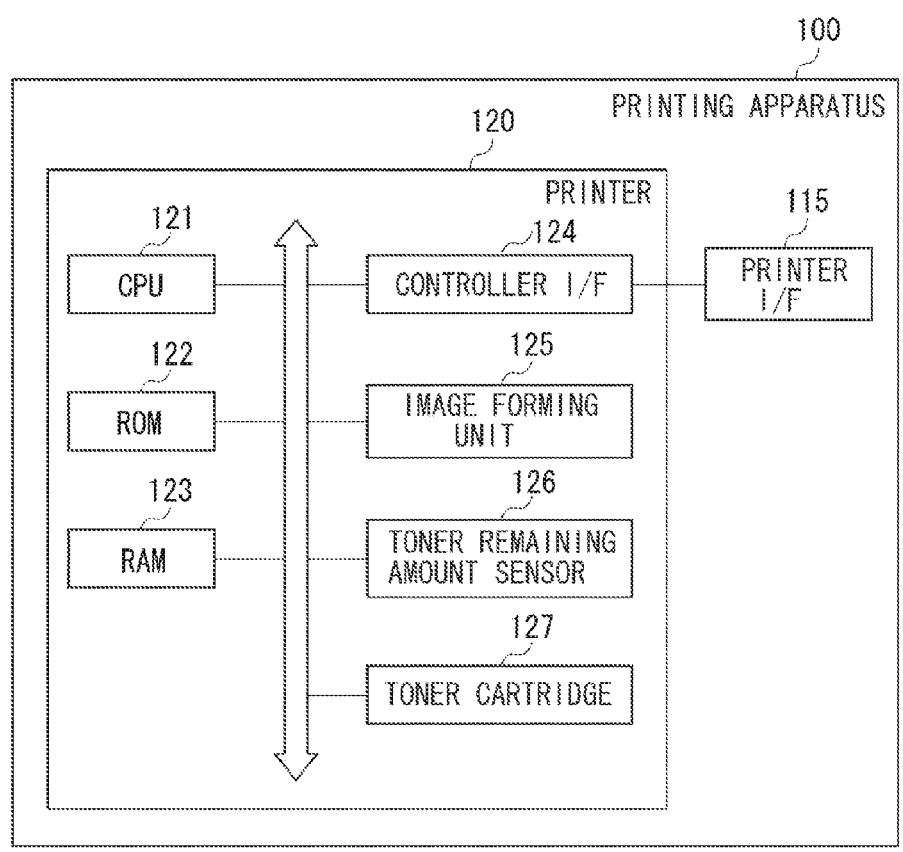
FIG. 2 illustrates a configuration of a printer included in the printing apparatus.

The configuration of the printer 120 will be described in detail below with reference to FIG. 2.

A controller I/F 124 connects the printer I/F 115 and the printer 120. The printer 120 communicates with the controller 110 via the controller I/F 124. A CPU 121 controls operations of the printer 120 in response to an instruction of the CPU 111. A ROM 122 stores control programs. A RAM 123 is used as a main memory for the CPU 121 and as a temporary storage area such as a work area.

An image forming unit 125 performs print processing on a sheet based on print data received from the controller 110. Although, in the present exemplary embodiment, print processing is performed based on the electrophotographic process, other method may be used.

A toner cartridge 127 is a storage unit for storing toner. The image forming unit 125 performs print processing by using the toner stored in the toner cartridge 127. The toner cartridge 127 is provided with a nonvolatile memory. This memory stores various information including information about the type (model number) of the toner cartridge 127.

A toner remaining amount sensor 126 detects the remaining amount of the toner stored in the toner cartridge 127. There are various methods for detecting the toner remaining amount, such as a magnetic permeability detection method, a magnet method, a piezoelectric vibration method, and a transmitted light method, and any method is applicable.

In the present exemplary embodiment, the toner remaining amount sensor 126 can only roughly detect the toner remaining amount such as 0% and 20%. Values 0% and 20% are examples, and other values may be used.

Although, in the present exemplary embodiment, the toner remaining amount sensor 126 and the toner cartridge 127 have specifically been described as separate units, the toner remaining amount sensor 126 may be integrated with the toner cartridge 127.

Figure 3:
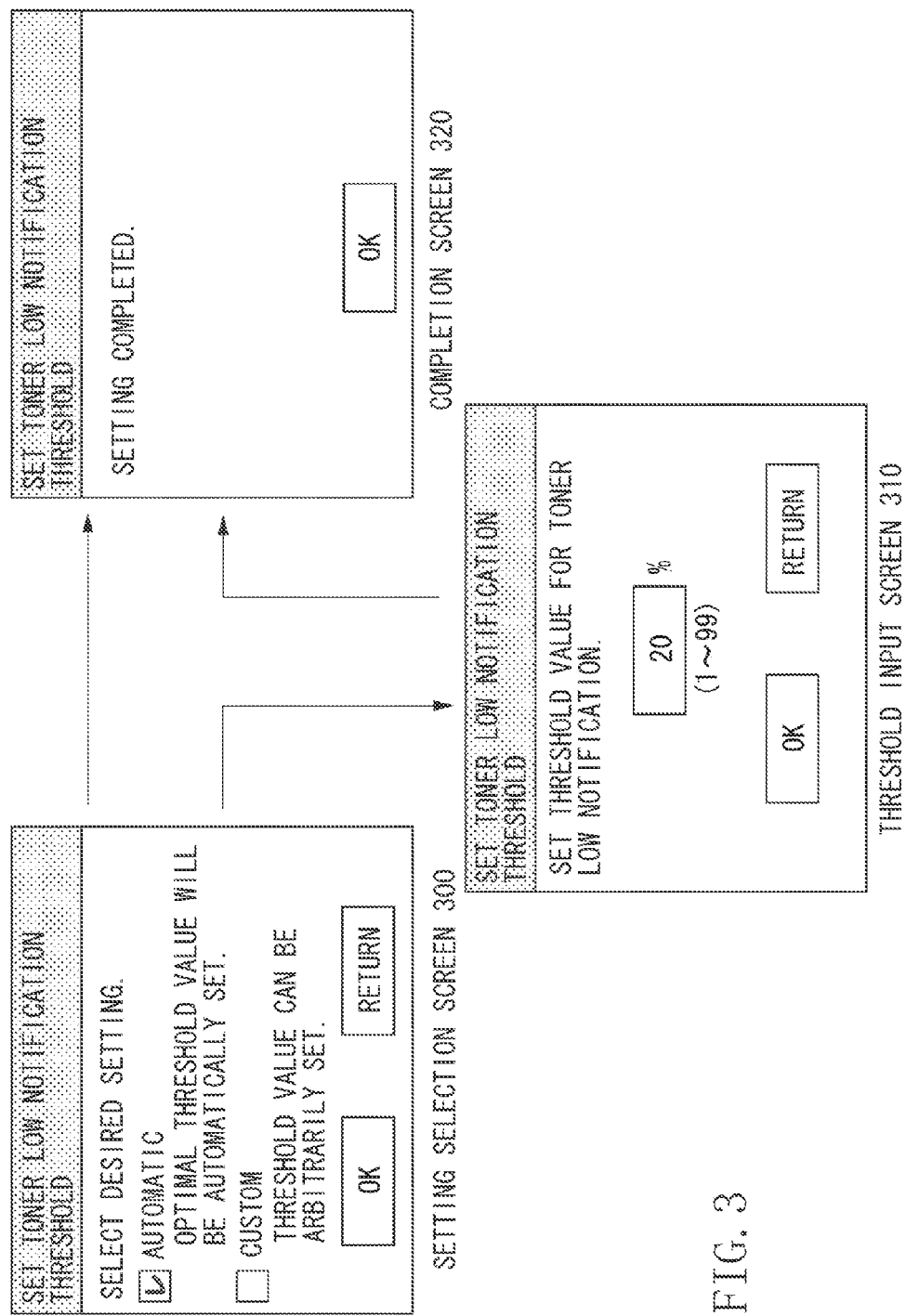
FIG. 3 illustrates a method for setting a toner LOW notification threshold value.

A setting for the toner LOW notification indicating a decreased amount of toner remaining will be described below with reference to FIG. 3. Each screen illustrated in FIG. 3 is displayed on the operation unit 140 in response to a user operation.

A setting selection screen 300 is used by the user to set a toner LOW notification threshold which is a threshold value for determining "toner LOW" (a state where there is a decreased toner remaining amount in the toner cartridge 127). In the case of the printing apparatus 100, the user is able to select either "Automatic" or "Custom" as a setting of the toner LOW notification threshold. When the "Automatic" setting is selected, the printing apparatus 100 automatically determines the toner LOW notification threshold based on the information acquired from the memory of the toner cartridge 127. When the "Custom" setting is selected, the printing apparatus 100 uses the toner LOW notification threshold set by the user.

When the user selects "Automatic" and presses an OK button in the setting selection screen 300, the operation unit 140 displays a completion screen 320. When "Automatic" is selected as the setting of the toner LOW notification threshold, the printing apparatus 100 automatically determines the toner LOW notification threshold based on the information acquired from the memory of the toner cartridge 127. Processing for determining the toner LOW notification threshold when "Automatic" is selected as the setting of this toner LOW notification threshold will be described in detail below with reference to FIG. 4.

On the other hand, when the user selects "Custom" in the setting selection screen 300, the operation unit 140 displays a threshold input screen 310. In the threshold input screen 310, the user is able to set a desired toner LOW notification threshold. The threshold input screen 310 illustrated in FIG. 3 displays "20%" as a default value. In the present exemplary embodiment, as the default value, the threshold value automatically determined when "Automatic" is selected as the setting of the toner LOW notification threshold is used. Therefore, if the user wants to know the toner LOW notification at an earlier timing, the user should set a toner LOW notification threshold which is larger than the default value. On the other hand, if the user wants to know the toner LOW notification at a later timing, the user should set a toner LOW notification threshold which is smaller than the default value.

When the user sets a toner LOW notification threshold and then presses the OK button in the threshold input screen 310, the operation unit 140 displays the completion screen 320. In the threshold input screen 310, the user is able to set a desired toner LOW notification threshold by using the keyboard and a numeric keypad (not illustrated). The threshold input screen 310 is used to accept a designation of the toner LOW notification threshold from the user.

In the case of the threshold input screen 310, the user is able to set a desired toner LOW notification threshold within a range from 1% to 99% of the remaining amount. However, a settable range of the threshold value is not limited to 1% to 99%. For example, the settable range may be changed for each toner cartridge type, or a specific user such as an administrator may preset a settable range of the threshold value.

Further, the toner LOW notification threshold illustrated in FIG. 3 may be set only by a specific user such as an administrator.

Figure 4:
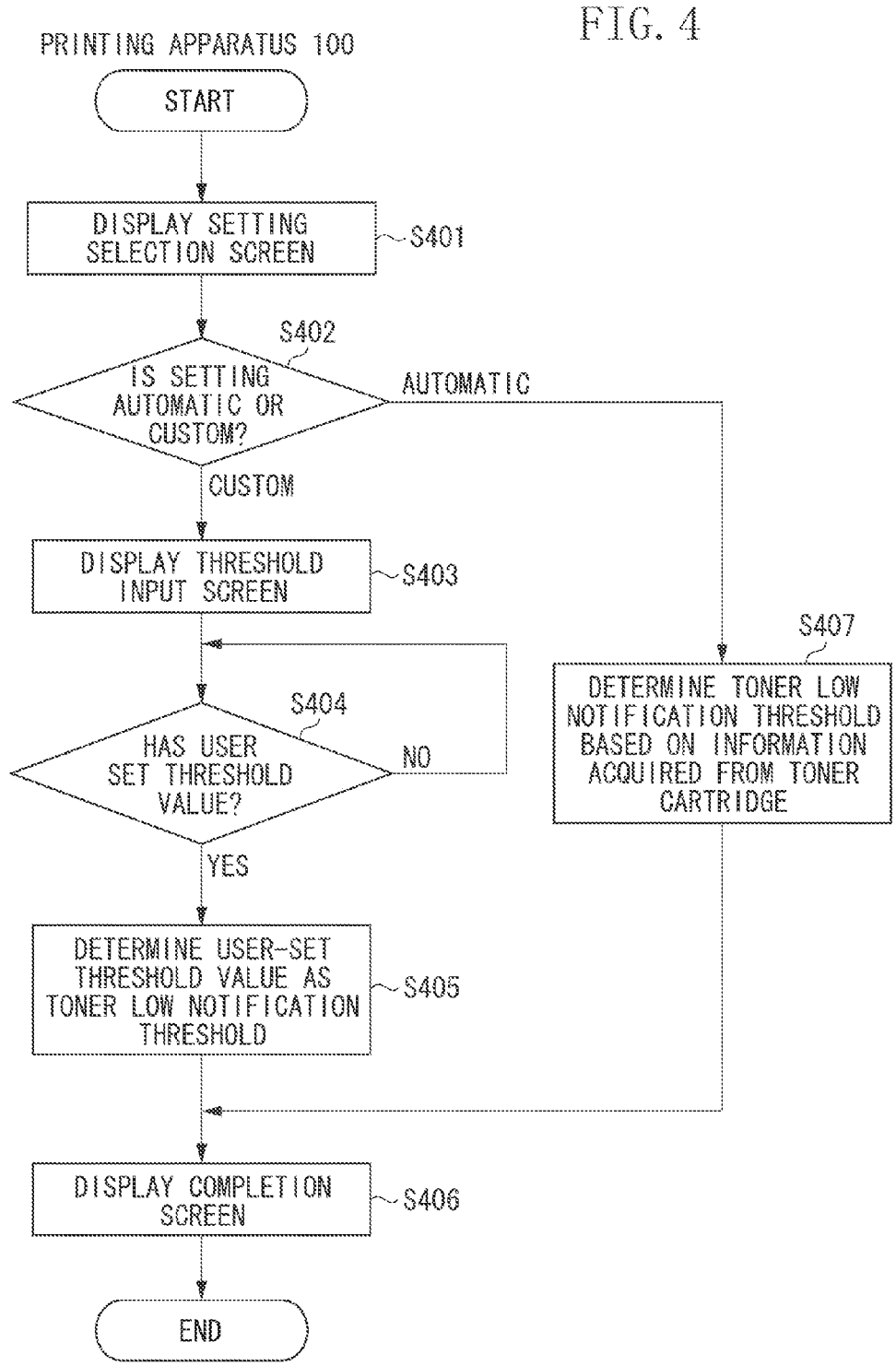
FIG. 4 is a flowchart illustrating processing for setting the toner LOW notification threshold value.

Processing performed by the printing apparatus 100 to determine the toner LOW notification threshold will be described below with reference to the flowchart illustrated in FIG. 4. Each step in the flowchart illustrated in FIG. 4 is implemented when the CPU 111 loads a control program stored in a memory such as the ROM 112 into the RAM 113 and then executes it.

When the printing apparatus 100 accepts an operation for displaying the setting selection screen 300 from the user, in step S401, the CPU 111 displays the setting selection screen 300 illustrated in FIG. 3 on the operation unit 140. In step S402, the CPU 111 determines whether the setting selected by the user is "Automatic" or "Custom" described above with reference to FIG. 3. When the setting selected by the user is "Automatic" (AUTOMATIC in step S402), the processing proceeds to step S407. On the other hand, when the setting selected by the user is "Custom" (CUSTOM in step S402), the processing proceeds to step S403.

Step S403 will be described below. In step S403, the CPU 111 displays the threshold input screen 310 illustrated in FIG. 3 on the operation unit 140. In the threshold input screen 310, the user is able to input a desired toner LOW notification threshold. In step S404, the CPU 111 determines whether the user has set a toner LOW notification threshold. When the user has not input a toner LOW notification threshold (NO in step S404), the CPU 111 waits until the user sets a toner LOW notification threshold while displaying the threshold input screen 310. On the other hand, when the user inputs the toner LOW notification threshold and then presses the OK button (YES in step S404), the CPU 111 determines that the user has set a toner LOW notification threshold, and the processing proceeds to step S405.

In step S405, the CPU 111 determines as the toner LOW notification threshold the threshold value set in the threshold input screen 310 by the user. For example, when the user sets 15% remaining amount as the toner LOW notification threshold in the threshold input screen 310, the CPU 111 determines to perform a toner LOW notification when the toner remaining amount has decreased down to 15%. In step S406, the CPU 111 displays the completion screen 320 illustrated in FIG. 3 on the operation unit 140.

Step S407 will be described below. When the user selects the "Automatic" setting in the setting selection screen 300, the CPU 111 determines the toner LOW notification threshold based on the information acquired from the toner cartridge 127. In step S406, the CPU 111 displays the completion screen 320 illustrated in FIG. 3 on the operation unit 140.

The printing apparatus 100 stores a threshold table for associating the toner cartridge types with the toner LOW thresholds detectable by the toner remaining amount sensor 126 of the toner cartridges. The CPU 111 is able to acquire identification information indicating the type of the toner cartridge 127 from the memory provided in the toner cartridge 127. In step S407, the CPU 111 compares the acquired identification information with the stored threshold table to identify an optimal toner LOW threshold for the toner cartridge 127. In step S407, the CPU 111 determines as the toner LOW notification threshold the toner LOW threshold identified by using the threshold table.

While the identification information indicating the type of the toner cartridge 127 is stored in the memory provided in the toner cartridge 127, detectable toner LOW thresholds may be stored in the memory of the toner cartridge 127. In this case, in step S407, the CPU 111 determines as the toner LOW notification threshold the toner LOW threshold acquired from the memory of the toner cartridge 127. If desired information cannot be acquired from the memory of the toner cartridge 127 for a certain reason such as a read error, etc., the CPU 111 may notify the user that the user may not be notified of toner LOW at a suitable timing, and error-exit from the processing of the flowchart illustrated in FIG. 4.

In the present exemplary embodiment, there is a case where the "Custom" setting is once selected and then changed in the setting selection screen 300. In such a case, the CPU 111 ignores the toner LOW notification threshold set in the threshold input screen 310 by the user, and automatically determines the toner LOW notification threshold based on the information acquired from the toner cartridge 127.

Processing for notifying the user of toner LOW based on the toner LOW notification threshold will be described below with reference to the flowchart illustrated in FIG. 5. Each step in the flowchart illustrated in FIG. 5 is implemented when the CPU 111 loads a control program stored in a memory such as the ROM 112 into the RAM 113 and then executes it.

In step S501, the CPU 111 identifies the toner remaining amount. The toner remaining amount may be the toner remaining amount detected by the toner remaining amount sensor 126 or the toner remaining amount predicted by using the toner consumption amount calculated based on the dot count value. Although the processing in step S501 is on the premise that it is performed by the CPU 111 when the printer 120 performs print processing, the CPU 111 may identify the toner remaining amount at fixed intervals regardless of the print processing.

Figure 6A:
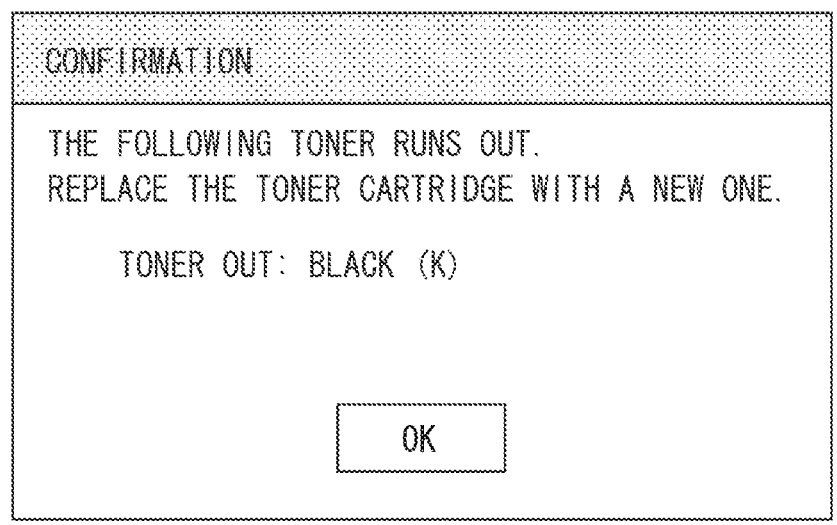
FIGS. 6A and 6B illustrate screens for notifying the user of toner LOW and toner out.

In step S502, the CPU 111 determines whether the toner remaining amount identified in step S501 is 0%. When the toner remaining amount is not 0% (NO in step S502), the processing proceeds to step S350. On the other hand, when the toner remaining amount is 0% (YES in step S502), then in step S506, the CPU 111 updates the toner remaining amount and notifies the user of toner out. In the present exemplary embodiment, the operation unit 140 displays a toner out notification screen 600 illustrated in FIG. 6A. The toner out notification screen 600 displays a message indicating that toner out has occurred.

Step S503 will be described below. In step S503, the CPU 111 determines whether the toner remaining amount identified in step S501 is equal to or less than the toner LOW notification threshold which is determined according to the "Automatic" or "Custom" setting described above with reference to FIGS. 3 and 4.

Figure 6B:
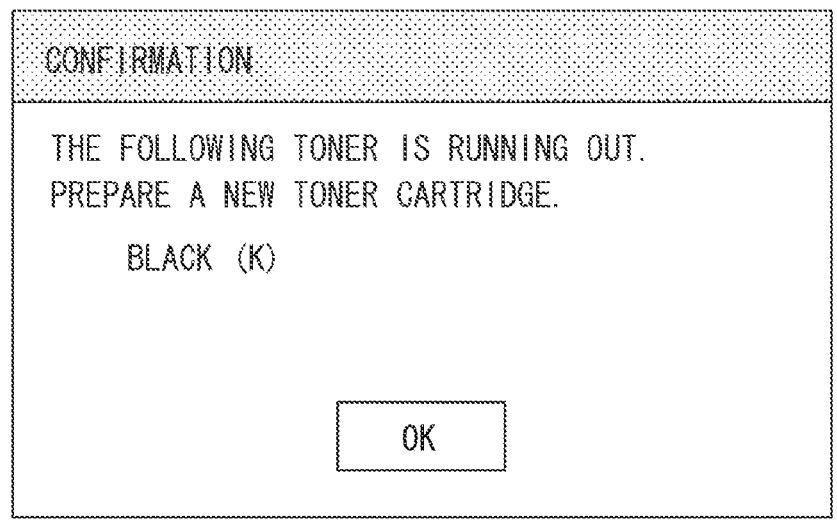

When the CPU 111 determines that the toner remaining amount identified in step S501 is equal to or less than the toner LOW notification threshold (YES in step S503), then in step S505, the CPU 111 updates the toner remaining amount and notifies the user of toner LOW. In the present exemplary embodiment, the operation unit 140 displays a toner LOW notification screen 610 illustrated in FIG. 6B. The toner LOW notification screen 610 displays a message indicating that toner LOW has occurred.

On the other hand, when the CPU 111 determines that the toner remaining amount identified in step S501 exceeds the toner LOW notification threshold (NO in step S503), then in step S504, the CPU 111 updates the toner remaining amount.

As described above, according to the present exemplary embodiment, the user is able to make a setting to use either the toner LOW notification threshold set by the user or the optimal threshold value for the toner cartridge 127 (the threshold value identified based on the information acquired from the toner cartridge 127). Thus, the user is able to use a desired threshold value according to the user's purpose of using the printing apparatus 100 or the policy of the environment where the printing apparatus 100 is used.

For example, if the user wants to know in an early stage that toner LOW will occur, the user can select "Custom" as the setting of the toner LOW notification threshold, and set a slightly large value as the threshold value. On the other hand, if the user does not need to know in an early stage that toner LOW will occur, the user can select "Custom" as the setting of the toner LOW notification threshold, and set a smaller value as the threshold value. Further, when it is not necessary to finely set the toner LOW notification, for example, the user only needs to select "Automatic" as the setting of the toner LOW notification threshold.

A second exemplary embodiment will be described below. In the first exemplary embodiment, the user selects either "Custom" or "Automatic" as the setting of the toner LOW notification threshold. On the other hand, in the present exemplary embodiment, the printing apparatus 100 prompts the user to change the setting of the toner LOW notification threshold from "Custom" to "Automatic" when a specific function is set.

The printing apparatus 100 is provided with a printing inhibit function for inhibiting printing when toner LOW occurs. When toner LOW occurs, a printing failure may occur, for example, printed characters may become faded. To prevent a printing failure from occurring, it is desirable to enable the above-described printing inhibit function. On the other hand, when the setting of the toner LOW notification threshold is "Custom", the printing apparatus 100 detects that toner LOW has occurred based on the predicted toner remaining amount. Therefore, when the setting of the toner LOW notification threshold is "Custom", the printing apparatus 100 may be unable to correctly notify the user of toner LOW compared with a case where the setting of the toner LOW notification threshold is "Automatic." Therefore, in the present exemplary embodiment, when the above-described printing inhibit function is enabled, the printing apparatus 100 prompts the user to change the toner LOW notification threshold from "Custom" to "Automatic."

The flowchart illustrated in FIG. 7 is processing performed by the printing apparatus 100 to prompt the user to change the setting of the toner LOW notification threshold from "Custom" to "Automatic." Each step of the flowchart illustrated in FIG. 7 is implemented when the CPU 111 loads a control program stored in a memory such as the ROM 112 into the RAM 113 and then executes it.

Figure 8A:
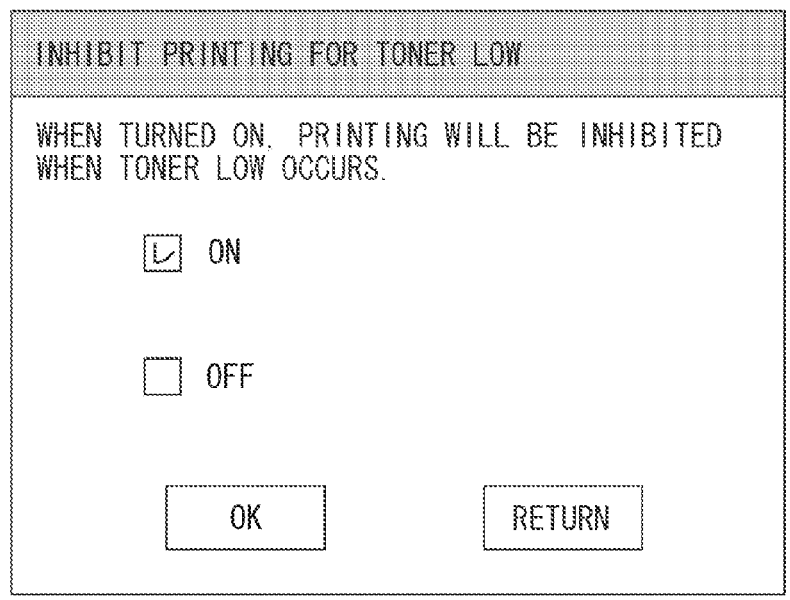
FIGS. 8A and 8B illustrate screens displayed by an operation unit.

When the printing apparatus 100 accepts an operation for setting the above-described printing inhibit function from the user, in step S701, the CPU 111 displays a setting screen for enabling or disabling the above-described printing inhibit function on the operation unit 140. A setting screen 800 displayed in step S701 is illustrated in FIG. 8A. The setting screen 800 illustrated in FIG. 8A is used to enable or disable the printing inhibit function for inhibiting printing when toner LOW occurs. When ON is set in the setting screen 800, the printing apparatus 100 enables the above-described printing inhibit function, and printing will be inhibited when toner LOW occurs. On the other hand, when "OFF" is set in the setting screen 800, the printing apparatus 100 disables the above-described printing inhibit function, and printing will not be inhibited even when toner LOW occurs.

In step S702, the CPU 111 determines whether the setting selected in the setting screen 800 by the user is "ON" or "OFF." When the CPU 111 determines that the setting selected in the setting screen 800 by the user is "OFF" (OFF in step S702), then in step S706, the CPU 111 turns OFF (disables) the above-described printing inhibit function.

On the other hand, when the CPU 111 determines that the setting selected in the setting screen 800 by the user is "ON" (ON in step S702), then in step S703, the CPU 111 determines whether the setting of the toner LOW notification threshold is "Automatic" or "Custom."

When the setting of the toner LOW notification threshold is "Automatic", enabling the above-described printing inhibit function causes no problem. Therefore, when the CPU 111 determines that the setting of the toner LOW notification threshold is "Automatic" (AUTOMATIC in step S703), then in step S705, the CPU 111 turns ON (enables) the above-described printing inhibit function.

On the other hand, when the setting of the toner LOW notification threshold is "Custom" (CUSTOM in step S703), enabling the above-described print function may cause printing failure. Therefore, in the present exemplary embodiment, in a case where the setting of the toner LOW notification threshold is "Custom" and the printing inhibit function for inhibiting printing when toner LOW occurs, is enabled, the CPU 111 prompts the user to change the setting of the toner LOW notification threshold to "Automatic." More specifically, when the CPU 111 determines that the setting of the toner LOW notification threshold is "Custom" (CUSTOM in step S703), then in step S704, the CPU 111 prompts the user to change the setting of the toner LOW notification threshold to "Automatic."

Figure 8B:
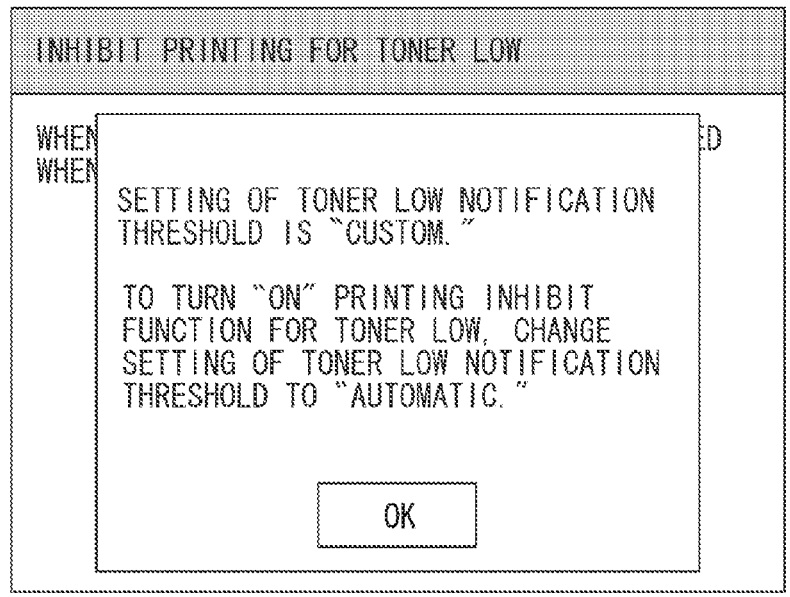

In step S704, the CPU 111 displays a warning screen 810 illustrated in FIG. 8B on the operation unit 140 to prompt the user to change the setting of the toner LOW notification threshold to "Automatic." After the user confirms the warning screen 810, by changing the setting of the toner LOW notification threshold to "Automatic", the user is able to enable the printing inhibit function for inhibiting printing when toner LOW occurs. In the present exemplary embodiment, unless the user changes the setting of the toner LOW notification threshold from "Custom" to "Automatic", the above-described printing inhibit function cannot be turned ON (enabled).

As described above, according to the present exemplary embodiment, when a specific function is enabled in the printing apparatus 100, the printing apparatus 100 is able to prompt the user to change the setting of the toner LOW notification threshold from "Custom" to "Automatic." Although, in the present exemplary embodiment, "the printing inhibit function for inhibiting printing when toner LOW occurs" has been described as an example of a specific function, the present exemplary embodiment is also applicable to other functions.

A third exemplary embodiment will be described below. In the second exemplary embodiment, when a specific function is enabled in the printing apparatus 100, the printing apparatus 100 prompts the user to change the setting of the toner LOW notification threshold from "Custom" to "Automatic." In the present exemplary embodiment, as a modification of the second exemplary embodiment, when a specific function is enabled in the printing apparatus 100, the printing apparatus 100 automatically changes the setting of the toner LOW notification threshold from "Custom" to "Automatic."

The flowchart illustrated in FIG. 9 is processing performed by the printing apparatus 100 to automatically change the setting of the toner LOW notification threshold from "Custom" to "Automatic." Each step in the flowchart illustrated in FIG. 9 is implemented when the CPU 111 loads a control program stored in a memory such as the ROM 112 into the RAM 113 and then executes it. The flowchart illustrated in FIG. 9 is a modification of the flowchart illustrated in FIG. 7. Steps assigned the same number as those in the flowchart illustrated in FIG. 7 perform similar processing to FIG. 7, and redundant descriptions thereof will be omitted.

When the CPU 111 determines that the setting selected in the setting screen 800 is "ON" (ON in step S702), then in step S703, the CPU 111 determines whether the setting of the toner LOW notification threshold is Automatic" or "Custom."

When the CPU 111 determines that the setting of the toner LOW notification threshold is "Custom." (CUSTOM in step S703), then in step S901, the CPU 111 automatically changes the setting of the toner LOW notification threshold to "Automatic." In step S902, the CPU 111 turns ON (enables) the above-described printing inhibit function. Although, in step S901, the CPU 111 automatically changes the setting of the toner LOW notification threshold to "Automatic", the CPU 111 may change the setting of the toner LOW notification threshold to "Automatic" after obtaining confirmation from the user, for example, by displaying a confirmation screen (not illustrated).

On the other hand, when the CPU 111 determines that the setting of the toner LOW notification threshold is "Automatic" (AUTOMATIC in step S703), then in step S902, the CPU 111 turns ON (enables) the above-described printing inhibit function.

As described above, according to the present exemplary embodiment, when a specific function is enabled in the printing apparatus 100, the printing apparatus 100 is able to automatically change the setting of the toner LOW notification threshold from "Custom" to "Automatic." Since the printing apparatus 100 automatically changes the setting of the toner LOW notification threshold from "Custom" to "Automatic", the user's trouble can be reduced compared with a case where the user manually changes the setting of the toner LOW notification threshold from "Custom" to "Automatic."

In the second and the third exemplary embodiments, when specific function is enabled in the printing apparatus 100, the printing apparatus 100 changes the setting of the toner LOW notification threshold from "Custom" to "Automatic", however, other modes are also applicable. For example, when a specific function is enabled in the printing apparatus 100, the printing apparatus 100 may automatically change the toner LOW notification threshold to a suitable threshold value while maintaining the "Custom" setting of the toner LOW notification threshold. The suitable threshold value may be, for example, the toner LOW threshold stored in the memory of the toner cartridge 127. Further, instead of automatically changing the toner LOW notification threshold to a suitable threshold value, the printing apparatus 100 may change the toner LOW notification threshold to a suitable threshold value after obtaining confirmation from the user.

In a case where the above-described printing inhibit function is turned ON (enabled) when the setting selection screen 300 illustrated in FIG. 3 is displayed, the printing apparatus 100 may prevent the user from selecting "Custom" in the setting selection screen 300.

Other Embodiments

Although, in the above-described exemplary embodiments, toner is used for printing as an example of a recording material, the recording material type to which the present invention is applicable is not limited to toner. For example, the present invention is applicable to a remaining amount LOW notification for an ink cartridge even in a case where ink is used instead of toner for printing.

The present invention can also be achieved when a program for implementing at least one of the above-described functions is supplied to a system or apparatus via a network or storage medium, and at least one processor in a computer of the system or apparatus reads and executes the program. The present invention can also be achieved by a circuit (for example, an application specific integrated circuit (ASIC)) for implementing at least one function.

According to the present invention, it is possible to select whether to use a threshold value set by a user as a threshold for notifying the user of a decreased remaining amount of a recording material.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention not limited to the disclosed exemplary embodiments. The scope of the following claims is to be accorded the broadest interpretation so as to encompass all such modifications and equivalent structures and functions.

This application claims the benefit of Japanese Patent Application No. 2015-024503, filed Feb. 10, 2015, which is hereby incorporated by reference herein in its entirety.

What is claimed is:

1. A printing apparatus for performing printing on a sheet by using a recording material, the printing apparatus comprising:
   a memory device that stores a set of instructions; and
   at least one processor that executes the instructions to:
   select a setting relating to a notification of a remaining amount of the recording material from at least a first setting and a second setting according to a user's instruction, the first setting being a setting in which a user-set threshold value is used for the notification of the remaining amount of the recording material wherein the user set threshold value can be changed by the user, and the second setting being a setting in which the user-set threshold value is not used for the notification of the remaining amount of the recording material;

display a display item relating to input of the user-set threshold value on a display device, being triggered by accepting a user's instruction for selecting the first setting, wherein, the display item relating to input of the user-set threshold value is not displayed on the display device in accordance with accepting a user's instruction for selecting the second setting;

identify a value corresponding to the remaining amount of the recording material;

perform a predetermined notification for the user based on a state that the identified value is equal to or less than the user-set threshold value, in a case where the first setting is selected; and perform the predetermined notification for the user based on a state that the identified value is equal to or less than a predetermined threshold value which cannot be changed by the user, in a case where the second setting is selected, wherein the user is prompted to change the setting relating to the notification of the remaining amount of the recording material from the first setting to the second setting in a case where a predetermined function is enabled.

2. The printing apparatus according to claim 1, wherein the instructions stored in the memory device further comprise instructions to:

display on the display device a selection screen for allowing the user to select either the first setting or the second setting, and set either the first setting or the second setting according to the user's instruction input via the selection screen.

3. The printing apparatus according to claim 2, wherein the instructions stored in the memory device further comprise instructions to:

display on the display device in a case where the first setting is selected in the selection screen by the user, a threshold input screen including the display item, for allowing the user to input a threshold value for performing the predetermined notification, and determine the threshold value input in the threshold input screen by the user, as the user-set threshold value.

4. The printing apparatus according to claim 3, wherein, in a case where the second setting is selected in the selection screen by the user, the threshold input screen is not displayed on the display device.

5. The printing apparatus according to claim 3, wherein a range of the threshold value which can be input on the threshold input screen by the user is determined based on a type of a storage unit for storing the recording material.

6. The printing apparatus according to claim 5, wherein the recording material is toner and the storage unit is a toner cartridge.

7. The printing apparatus according to claim 6, wherein the predetermined notification prompts preparation of a new toner cartridge in which a recording material is stored.

8. The printing apparatus according to claim 6, wherein the predetermined threshold value is determined based on information acquired from the toner cartridge.

9. The printing apparatus according to claim 3, wherein the threshold input screen further includes information indicating a settable upper limit value and a settable lower limit value of the user-set threshold value.

10. The printing apparatus according to claim 1, wherein the instructions stored in the memory further comprise instructions to:

change the setting relating to the notification of the remaining amount of the recording material from the first setting to the second setting in a case where a function of inhibiting printing when the remaining amount of the recording material is equal to or less than the user-set threshold value is enabled in the printing apparatus.

11. The printing apparatus according to claim 1, wherein the instructions stored in the memory further comprise instructions to:

prompt the user to change the setting relating to the notification of the remaining amount of the recording material from the first setting to the second setting in a case where a function of inhibiting printing when the remaining amount of the recording material is equal to or less than the user-set threshold value is enabled in the printing apparatus.

12. The printing apparatus according to claim 1, wherein the recording material is toner.

13. The printing apparatus according to claim 1, wherein the first predetermined notification and the second predetermined notification indicate that the remaining amount of the recording material is small.

14. A method for controlling a printing apparatus for performing printing on a sheet by using a recording material, the method comprising:

selecting a setting relating to a notification of a remaining amount of the recording material from at least a first setting and a second setting according to a user's instruction, the first setting being a setting in which a user-set threshold value is used for the notification of the remaining amount of the recording material wherein the user-set threshold value can be changed by the user, and the second setting being a setting in which the user-set threshold value is not used for the notification of the remaining amount of the recording material;

displaying a display item relating to input of the user-set threshold value on a display device, being triggered by accepting a user's instruction for selecting the first setting, wherein, the display item relating to input of the user-set threshold value is not displayed on the display device in accordance with accepting a user's instruction for selecting the second setting;

identifying a value corresponding to the remaining amount of the recording material;

performing a predetermined notification for the user based on the state that the identified value is equal to or less than the user-set threshold value, in a case where the first setting is selected; and performing the predetermined notification for the user based on the state that the identified value is equal to or less than a predetermined threshold value which cannot be changed by the user, in a case where the second setting is selected, wherein the user is prompted to change the setting relating to the notification of the remaining amount of the recording material from the first setting to the second setting in a case where a predetermined function is enabled.

15. A non-transitory storage medium storing a program for causing a computer to execute a method for controlling a printing apparatus for performing printing on a sheet by using a recording material, the method comprising:
- selecting a setting relating to a notification of a remaining amount of the recording material from at least a first setting and a second setting according to a user's instruction, the first setting being a setting in which a user-set threshold value which can be changed by the user is used for the notification of the remaining amount of the recording material, and the second setting being a setting in which the user-set threshold value is not used for the notification of the remaining amount of the recording material;
- displaying a display item relating to input of the user-set threshold value on a display device, being triggered by accepting a user's instruction for selecting the first setting,
- wherein, the display item relating to input of the user-set threshold value is not displayed on the display device in accordance with accepting a user's instruction for selecting the second setting;
- identifying a value corresponding to the remaining amount of the recording material;
- performing a predetermined notification for the user based on the state that the identified value is equal to or less than the user-set threshold value, in a case where the first setting is selected; and
- performing the predetermined notification for the user based on the state that the identified value is equal to or less than a predetermined threshold value which cannot be changed by the user, in a case where the second setting is selected,
- wherein the user is prompted to change the setting relating to the notification of the remaining amount of the recording material from the first setting to the second setting in a case where a predetermined function is enabled.

* * * * *